United States Patent
Kim

(10) Patent No.: US 8,750,872 B2
(45) Date of Patent: Jun. 10, 2014

(54) METHOD FOR CONTROLLING CELL RESELECTION AND TERMINAL TO PERFORM THE METHOD

(75) Inventor: Jongyeob Kim, Seoul (KR)

(73) Assignee: Pantech Co., Ltd., Seoul (KR)

(*) Notice: Subject to any disclaimer, the term of this patent is extended or adjusted under 35 U.S.C. 154(b) by 667 days.

(21) Appl. No.: 12/477,567

(22) Filed: Jun. 3, 2009

(65) Prior Publication Data

US 2009/0318116 A1 Dec. 24, 2009

(30) Foreign Application Priority Data

Jun. 19, 2008 (KR) .................. 10-2008-0057712

(51) Int. Cl.
*H04W 4/00* (2009.01)

(52) U.S. Cl.
USPC .............. 455/435.2; 455/552.1; 455/525; 455/411; 455/436; 455/434; 370/331; 370/338

(58) Field of Classification Search
USPC ........ 455/411, 436–444, 422.1, 432.1–435.2, 455/552.1, 525, 67.11, 423; 370/331, 338
See application file for complete search history.

(56) References Cited

U.S. PATENT DOCUMENTS

| | | | |
|---|---|---|---|
| 6,788,959 B2* | 9/2004 | Jokinen et al. | 455/552.1 |
| 6,975,608 B1* | 12/2005 | Park et al. | 370/332 |
| 7,483,702 B2* | 1/2009 | Yeo et al. | 455/449 |
| 7,535,846 B2* | 5/2009 | Kim et al. | 370/241 |
| 7,596,378 B1* | 9/2009 | Nizri et al. | 455/448 |
| 8,121,633 B2* | 2/2012 | Cormier et al. | 455/525 |
| 8,125,956 B2* | 2/2012 | Reddy et al. | 370/331 |
| 8,478,273 B2* | 7/2013 | Martin | 455/436 |
| 8,619,729 B2* | 12/2013 | Alper et al. | 370/338 |
| 2002/0072358 A1* | 6/2002 | Schneider et al. | 455/423 |
| 2004/0136340 A1* | 7/2004 | Sanchez et al. | 370/329 |
| 2004/0259548 A1* | 12/2004 | Moon et al. | 455/436 |
| 2004/0266435 A1* | 12/2004 | de Jong et al. | 455/436 |
| 2006/0040700 A1* | 2/2006 | Roberts et al. | 455/525 |
| 2008/0102847 A1* | 5/2008 | Kim et al. | 455/450 |
| 2009/0215452 A1* | 8/2009 | Balasubramanian et al. | 455/434 |
| 2009/0233600 A1* | 9/2009 | Johansson et al. | 455/435.2 |
| 2009/0285170 A1* | 11/2009 | Rangaiah | 370/329 |

OTHER PUBLICATIONS

"3GPP TS 24.008 V8.2.0 (Jun. 2008)" 3rd Generation Partnership Project; Technical Specification Group Core Network and Terminals; Mobile radio interface Layer 3 specification; Core network protocols; Stage 3 (Release 8).

(Continued)

*Primary Examiner* — Sharad Rampuria
(74) *Attorney, Agent, or Firm* — H.C. Park & Associates, PLC

(57) ABSTRACT

A method for controlling cell reselection of a dual mode terminal supporting Wideband Code Division Multiple Access (WCDMA) and Global System for Mobile communications (GSM), includes determining, when a signal strength of a first cell is less than a predetermined value, whether a condition for access to a second cell is satisfied; determining whether a frequency and a Primary Scrambling Code (PSC) for access to the second cell are blocked; and determining whether the second cell is included in a forbidden location area (LA) list. Then, if the frequency and PSC are not blocked, and if the second cell is not included in the forbidden LA list, the method includes connecting to the second cell. A dual mode terminal to perform the method includes a condition determination unit, a blocking determination unit, an LA determination unit, and a control determination unit.

21 Claims, 3 Drawing Sheets

(56) References Cited

OTHER PUBLICATIONS

"3GPP TS 23.122 V8.2.0 (Jun. 2008)" 3rd Generation Partnership Project; Technical Specification Group Core Network and Terminals; Non-Access-Stratum (NAS) functions related to Mobile Station (MS) in idle mode (Release 8).

"3GPP TSA 45.008 V7.11.0 (Feb. 2008)" 3rd Generation Partnership Project; Technical Specification Group GSM/EDGE Radio Access Network; Radio subsystem link control (Release 7).

Global System for Mobile Communications, Digital cellular telecommunications system (Phase 2); Functions related to Mobile Station (MS) in idle mode (GSM 03.22), European Telecommunications Standards Institute, Sep. 1996, Fourth Edition (ETS 300 535).

Global System for Mobile Communications, Digital cellular telecommunications system (Phase 2); Radio subsystem link control (GSM 05.08 version 4.22.1), European Telecommunications Standards Institute, Mar. 1999, Thirteenth Edition (ETS 300 578).

* cited by examiner

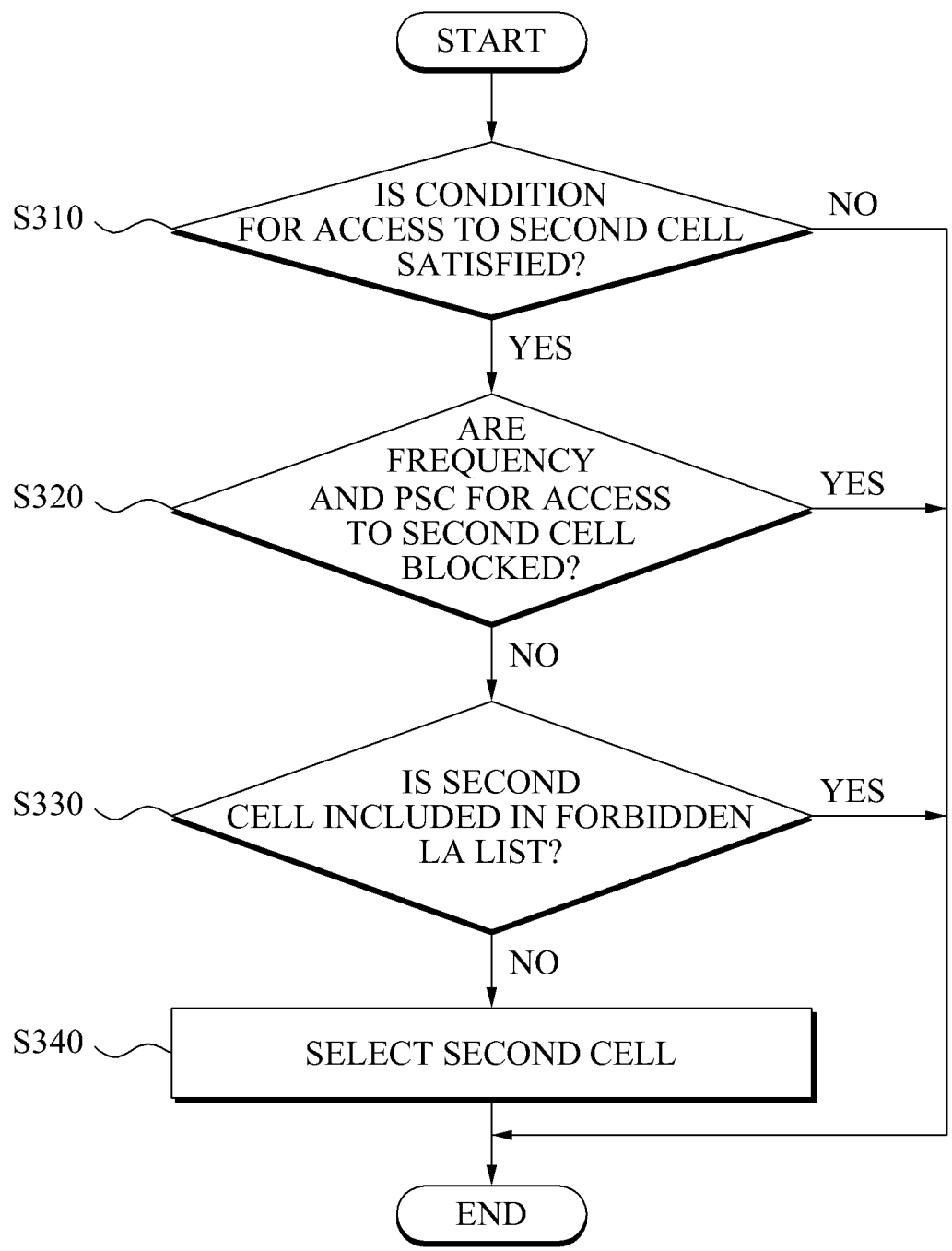

METHOD FOR CONTROLLING CELL RESELECTION AND TERMINAL TO PERFORM THE METHOD

CROSS REFERENCE TO RELATED APPLICATION

This application claims priority from and the benefit of Korean Patent Application No. 10-2008-0057712, filed on Jun. 19, 2008, which is hereby incorporated by reference for all purposes as if fully set forth herein.

BACKGROUND OF THE INVENTION

1. Field of the Invention

The present invention relates to a method for controlling a cell reselection and a terminal to perform the method, and more particularly, to a method for controlling a cell reselection that may reduce the risk of a ping-pong phenomenon during the cell reselection process, and a dual mode terminal to perform the method.

2. Discussion of the Background

A Universal Terrestrial Radio Access Network (UMTS) terminal supporting Wideband Code Division Multiple Access (WCDMA) and a Global System for Mobile communications (GSM) performs a handover or reselection of a cell with a high priority in an area where two types of Radio Access Technologies (RAT) both exist. As used in this application, the term "terminal" and "dual mode terminal" will refer to a mobile communication terminal capable of supporting two different radio access technologies, such as WCDMA and GSM.

Although a handover during a call is controlled by the network, cell reselection in an idle state may be determined by a terminal itself and is not controlled by the network. Accordingly, if a terminal in an idle state is located in an area where a WCDMA cell and a GSM cell both exist, the terminal may reselect the WCDMA cell or the GSM cell that satisfies a predetermined condition.

When a WCDMA network, which has different Location Area (LA) codes with respect to an identical Public Land Mobile Network (PLMN) due to the cell reselection, is obtained, and a location registration is attempted but fails, a terminal may perform a PLMN reselection for retrieving different LAs with respect to an identical PLMN regardless of a cell reselection algorithm and regardless of whether a network selection mode is automatic or manual according to a $3^{rd}$ Generation Partnership Project (3GPP) Technical Specification (TS) 23.122 standard. In this instance, although a GSM cell could be obtained, the same WCDMA network may be obtained again according to the cell reselection, even though the location registration failed once.

When a location registration fails in a manual mode due to a particular reason, an attempt to retrieve a new LA may be made despite a manual mode based on the 3GPP TS 23.122 standard. Accordingly, a terminal retrieves another LA with respect to an identical PLMN regardless of a cell reselection algorithm.

Accordingly, since a terminal is in a limited state depending on a network mode, until a GSM cell is obtained again due to PLMN reselection regardless of a cell reselection algorithm, an appropriate call originating and call terminating operation may not be performed, and a ping-pong phenomenon between a GSM cell and a WCDMA cell may occur.

SUMMARY OF THE INVENTION

This invention provides a dual mode terminal and a method for controlling a cell reselection to prevent a cell reselection from being made even though a cell reselection condition is satisfied. By preventing the cell reselection when a corresponding cell may not provide an appropriate voice and data service during a cell reselection between a GSM cell and a WCDMA cell depending on a network environment, the method may reduce the risk of a ping-pong phenomenon from occurring during the cell reselection.

This invention also provides a dual mode terminal and a method for controlling a cell reselection to reduce the risk of the dual mode terminal obtaining a network that may not provide an appropriate service despite an appropriate signal state.

This invention also provides a method for controlling a cell reselection of a dual mode terminal if a network selection mode is an automatic mode or a manual mode, when determining whether a corresponding cell is a barred or forbidden. The method may be applied to both a cell reselection from a GSM cell to a WCDMA cell and a cell reselection from a WCDMA cell to a GSM cell.

Additional features of the invention will be set forth in the description which follows, and in part will be apparent from the description, or may be learned by practice of the invention.

The present invention discloses a method for controlling a cell reselection of a dual mode terminal, the method including disconnecting from a currently connected first cell; determining whether a condition for access to a second cell is satisfied; determining whether a frequency and a Primary Scrambling Code (PSC) for access to the second cell are blocked; determining whether the second cell is included in a forbidden location area (LA) list; and connecting to the second cell.

The present invention also discloses a dual mode terminal, including a condition determination unit to disconnect from a currently connected first cell and to determine whether a condition for access to a second cell is satisfied; a blocking determination unit to determine whether a frequency and a PSC for access to the second cell are blocked; an LA determination unit to determine whether the second cell is included in a forbidden LA list; and a control determination unit to control a connection to the second cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a flowchart illustrating a method for controlling a cell reselection of a dual mode terminal according to an exemplary embodiment of the present invention.

DETAILED DESCRIPTION OF THE ILLUSTRATED EMBODIMENTS

Figure 1:
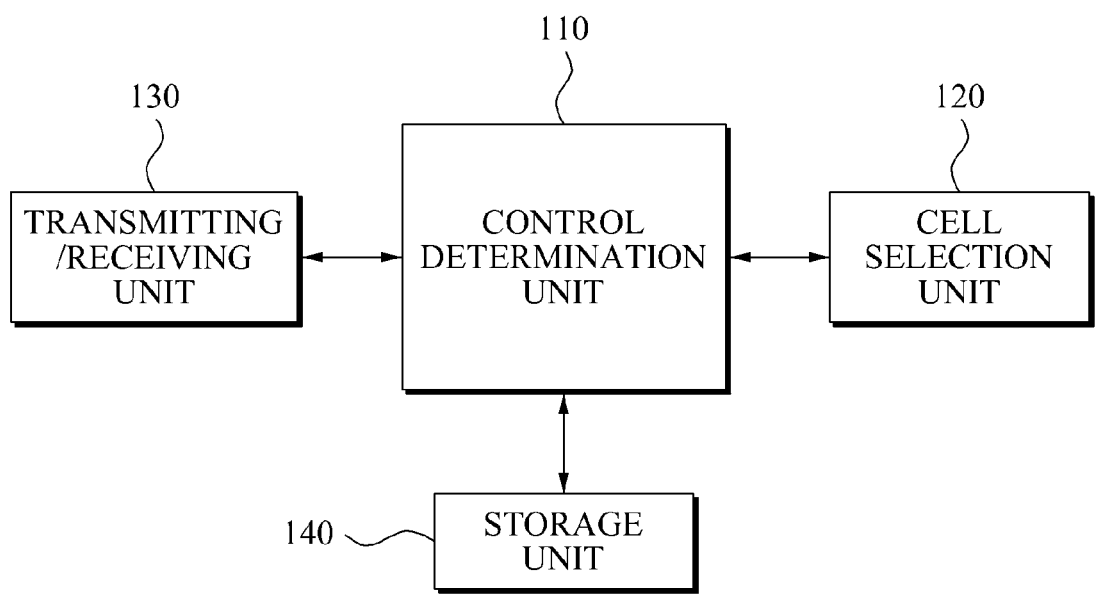
FIG. 1 is a block diagram illustrating a dual mode terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
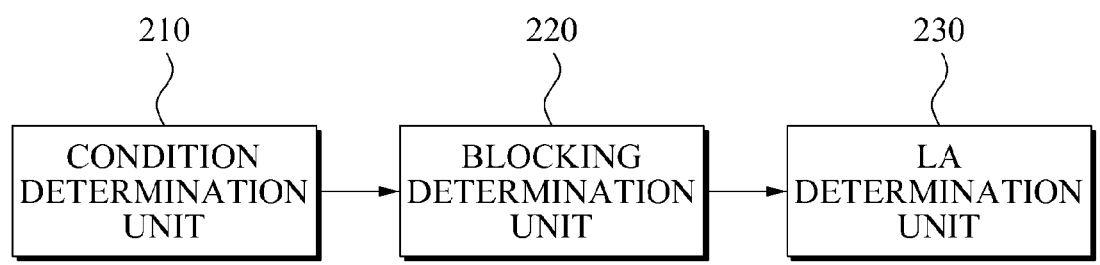
FIG. 2 is a block diagram illustrating a cell selection unit according to an exemplary embodiment of the present invention.

FIG. 1 is a block diagram illustrating a dual mode terminal according to an exemplary embodiment of the present invention. FIG. 2 is a block diagram illustrating a cell selection unit 120 according to an exemplary embodiment of the present invention. The dual mode terminal according to an exemplary embodiment of the present invention and the cell selection unit 120 are described in detail with reference to FIG. 1 and FIG. 2.

As illustrated in FIG. 1, the dual mode terminal includes a control determination unit 110, a cell selection unit 120, a transmitting/receiving unit 130, and a storage unit 140.

As shown in FIG. 2, the cell selection unit 120 includes a condition determination unit 210, a blocking determination unit 220, and an LA determination unit 230.

The cell selection unit 120 determines whether a condition for access to a first cell or a second cell is satisfied. Also, the cell selection unit 120 determines whether a frequency and a Primary Scrambling Code (PSC) of a corresponding cell are blocked, and determines whether the corresponding cell is included in a forbidden LA list in order to reselect a cell.

The transmitting/receiving unit 130 may transmit and/or receive communication signal data through the reselection of the first cell or the second cell.

The storage unit 140 may include a Read Only Memory (ROM), Random Access Memory (RAM), flash ROM, and the like. The storage unit 140 may store reference data and a micro code of program under control of the control determination unit 110. Also, the storage unit 140 may store updatable storage data and temporary data generated while a variety of programs are performed.

The cell selection unit 120 is described in greater detail with reference to FIG. 2.

The condition determination unit 210 disconnects from a currently connected first cell and determines whether a condition for access to a second cell is satisfied.

The first cell may be a WCDMA cell or a GSM cell. The second cell also may be a WCDMA cell or a GSM cell. If the first cell is the WCDMA cell, then the second cell may be the GSM cell. Similarly, if the first cell is the GSM cell, the second cell may be the WCDMA cell.

A reselection of the WCDMA cell may be made when the GSM cell is obtained. Conversely, a reselection of the GSM cell may be made when the WCDMA cell is obtained.

The condition for access to a second cell may include the conditions defined in 3GPP TS 45.008. These conditions are as follows: (1) a measured Received Signal Code Power (RSCP) of the second cell is greater than a Received Level Average (RLA_C) based on an offset (FDD_Qoffset) of signal strength of the first and second cells; (2) a measured Energy to Noise Ratio (Ec/No) of the second cell is equal to or greater than a difference value between a minimum signal strength value (FDD_Qmin) of the first and second cells and an offset (FDD_Qmin_Offset) of the minimum signal strength value of the first and second cells; and (3) the measured RSCP of the second cell is equal to or greater than an RSCP threshold (FDD_RSCP_threshold) of the first and second cells.

The RLA_C is an average of received level values of a serving first cell and a non-serving first cell. Also, a cell reselection between the GSM cell and WCDMA cell may be made if all the conditions described above are satisfied. The cell reselection may also require that the conditions described above are maintained for a certain period of time, such as at least five seconds.

After the conditions are satisfied and a cell reselection of the second cell is made, a cell reselection of the first cell may be made again. If the cell reselection of the second cell from the first cell is made again within a second period of time, such as 15 seconds, the conditions are reevaluated with an offset (FDD_Qoffset) of a signal strength of the first and second cells being increased by 5 dB to determine the reselection of the second cell.

For example, after the conditions are satisfied and the cell reselection of the WCDMA cell is made, the cell reselection of the GSM cell may be made again. Also, if the cell reselection of the WCDMA cell from the GSM cell is made again within a second time period, such as 15 seconds, the corresponding FDD_Qoffset value is increased by 5 dB and then it is determined whether the conditions are satisfied. As a result, it is determined whether the cell reselection of the WCDMA cell is made.

Also, if a mode for a network selection search is set as a manual mode, the condition determination unit 210 determines whether a location registration of the first cell fails. If the location registration of the first cell fails, the condition determination unit 210 determines whether the condition for access to the second cell is satisfied.

If a location registration fails in the manual mode, the dual mode terminal remains in a current corresponding cell that may not provide an appropriate voice and data service according to a 3GPP TS 24.008 international standard, and thereby may not attempt to retrieve a new LA. However, if the location registration fails due to NO_SUITABLE_CELLS_IN_LA, the dual mode terminal may attempt to retrieve a new LA according to the 3GPP TS 23.122 standard despite being in the manual mode. Accordingly, another LA with respect to an identical Public Land Mobile Networks (PLMN) may be retrieved regardless of a cell reselection algorithm.

Thus, even if the mode for the network selection search is set as the manual mode, the cell reselection method may be applied by the dual mode terminal.

If the condition for access to the second cell is satisfied, the blocking determination unit 220 determines whether a frequency and a PSC for access to the second cell are blocked.

Specifically, even though the cell reselection condition from the GSM cell to the WCDMA cell is satisfied, it is determined whether a frequency and a PSC of the WCDMA cell are blocked with respect to the WCDMA cell.

The frequency of the second cell may be any one of Universal Mobile Telecommunications System (UMTS) Terrestrial Radio Access (UTRA) Absolute Radio Frequency Channel Number (UARFCN) and Absolute Radio Frequency Channel Number (ARFCN).

If the frequency and PSC for the access to the second cell are not blocked, the LA determination unit 230 determines whether the second cell is included in a forbidden LA list.

The forbidden LA list may include a list of forbidden LAs for roaming, a list of forbidden LAs for regional provision of service, a forbidden PLMNs list, a list of forbidden PLMNs for General Packet Radio Service (GPRS) service, and the like.

For example, if the WCDMA cell, which is the second cell, is a barred cell, the control determination unit 110 prevents the WCDMA cell from being reselected, and the dual mode terminal remains in the GSM cell, which is a camped-on first cell. Also, the condition determination unit 210 continues to measure an RSCP and Eb/No of a serving GSM cell and a neighboring GSM cell, or of a WCDMA cell.

If the LA determination unit 230 determines that the second cell is not included in the forbidden LA list, the control determination unit 110 controls the reselection of the second cell to be attempted.

For example, if the WCDMA cell is not included in the forbidden LA list, the control determination unit 110 controls the reselection of the WCDMA cell to be attempted. Specifically, if the WCDMA cell does not correspond to a forbidden LA, the control determination unit 110 controls the reselection of the WCDMA cell to be attempted. If the WCDMA cell corresponds to the forbidden LA, the control determination unit 110 prevents the WCDMA cell from being reselected. Accordingly, the control determination unit 110 controls the WCDMA cell to stay in the camped on GSM cell, and the condition determination unit 210 continues to measure the RSCP and Eb/No of the serving GSM cell and the neighboring GSM cell, or the WCDMA cell.

If the LA determination unit 230 determines that the second cell is included in the forbidden LA list, the control determination unit 110 prevents the second cell from being reselected, controls the second cell to stay in the camped on first cell, and the condition determination unit 210 continues to measure the RSCP and Eb/No of the serving first cell and the neighboring first cell, or of the second cell.

Thus, if a corresponding cell may not provide an appropriate voice and data service while a cell reselection between the GSM and WCDMA cells is made based on a network environment, the cell reselection may be prevented from being made even though a cell reselection condition is satisfied. Thus, an unnecessary ping-pong phenomenon may be reduced during the cell reselection process.

FIG. 3 is a flowchart illustrating a method for controlling a cell reselection of a dual mode terminal according to an exemplary embodiment of the present invention. The method for controlling a cell reselection of a dual mode terminal is described in detail with reference to FIG. 3.

In operation S310, a currently connected first cell is disconnected and it is determined whether a condition for access to a second cell is satisfied.

The first cell may be a WCDMA cell or a GSM cell. The second cell also may be a WCDMA cell or a GSM cell. If the first cell is the WCDMA cell, then the second cell may be the GSM cell. Similarly, if the first cell is the GSM cell, then the second cell may be the WCDMA cell.

A reselection of the WCDMA cell may be made when the GSM cell is obtained. Conversely, a reselection of the GSM cell may be made when the WCDMA cell is obtained.

The condition for access to a second cell may include the conditions defined in 3GPP TS 45.008. These conditions are as follows: (1) a measured Received Signal Code Power (RSCP) of the second cell is greater than a Received Level Average (RLA_C) based on an offset (FDD_Qoffset) of signal strength of the first and second cells; (2) a measured Energy to Noise Ratio (Eb/No) of the second cell is equal to or greater than a difference value between a minimum signal strength value (FDD_Qmin) of the first and second cells and an offset (FDD_Qmin_Offset) of the minimum signal strength value of the first and second cells; and (3) the measured RSCP of the second cell is equal to or greater than an RSCP threshold (FDD_RSCP_threshold) of the first and second cells.

The RLA_C is an average of received level values of a serving first cell and a non-serving first cell. Also, a cell reselection between the GSM cell and WCDMA cell may be made if all the conditions described above are satisfied. The cell reselection may also require that the conditions described above are maintained for a certain period of time, such as at least five seconds.

After the conditions are satisfied and a cell reselection of the second cell is made, a cell reselection of the first cell may be made again. If the cell reselection of the second cell from the first cell is made again within a second period of time, such as 15 seconds, the conditions are reevaluated with an offset (FDD_Qoffset) of a signal strength of the first and second cells being increased by 5 dB to determine the reselection of the second cell.

For example, after the conditions are satisfied and the cell reselection of the WCDMA cell is made, the cell reselection of the GSM cell may be made again. Also, if the cell reselection of the WCDMA cell from the GSM cell is made again within a second time period, such as 15 seconds, the corresponding FDD_Qoffset value is increased by 5 dB and then it is determined whether the conditions are satisfied. As a result, it is determined whether the cell reselection of the WCDMA cell is made.

Also, if a mode for a network selection search is set as a manual mode, it is determined whether a location registration of the first cell fails. If the location registration of the first cell fails, it is determined whether the condition for access to the second cell is satisfied.

If a location registration fails in the manual mode, a dual mode terminal remains in a current corresponding cell that may not provide an appropriate voice and data service according to a 3GPP TS 24.008 international standard, and thereby may not attempt to retrieve a new LA. However, if the location registration fails due to NO_SUITABLE_CELLS_IN_LA, the dual mode terminal may attempt to retrieve another LA according to the 3GPP TS 23.122 standard despite being in the manual mode. Accordingly, the other LA with respect to an identical PLMN may be retrieved regardless of a cell reselection algorithm. Thus, even if the mode for the network selection search is set as the manual mode, the cell reselection method may be applied by the dual mode terminal.

In operation S320, if the condition for access to the second cell is satisfied, it is determined whether a frequency and a PSC for access to the second cell are blocked.

Specifically, even though the cell reselection condition from the GSM cell to the WCDMA cell is satisfied, it is determined whether a frequency and a PSC of the WCDMA cell are blocked with respect to the WCDMA cell. The frequency of the second cell may be any one of UARFCN and ARFCN.

In operation S330, if the frequency and PSC for the access to the second cell are not blocked, it is determined whether the second cell is included in a forbidden LA list.

The forbidden LA list may include a list of forbidden LAs for roaming, a list of forbidden LAs for regional provision of service, a forbidden PLMNs list, a list of forbidden PLMNs for GPRS service, and the like.

For example, if the WCDMA cell, which is the second cell, is a barred cell, the WCDMA cell is prevented from being reselected, and the dual mode terminal remains in the GSM cell, which is a camped-on first cell. Also, an RSCP and Eb/No are measured of a serving GSM cell and a neighboring GSM cell, or of a WCDMA cell.

In operation S340, if the second cell is not included in the forbidden LA list, a reselection of the second cell is attempted.

For example, if the WCDMA cell is not included in the forbidden LA list, the WCDMA cell is controlled to be reselected. Specifically, if the WCDMA cell does not correspond to a forbidden LA, the WCDMA cell is controlled to be reselected. If the WCDMA cell corresponds to the forbidden LA, the WCDMA cell is prevented from being reselected. Accordingly, the dual mode terminal is controlled to stay in the camped-on GSM cell, and the RSCP and Eb/No are measured of the serving GSM cell and the neighboring GSM cell, or of the WCDMA cell.

If the second cell is included in the forbidden LA list, the second cell is prevented from being reselected, and the dual mode terminal is controlled to stay in the camped on first cell. Also, the RSCP and Eb/No are measured of the serving first cell and the neighboring first cell, or of the second cell.

Thus, if a corresponding cell may not provide an appropriate voice and data service while a cell reselection between the GSM and WCDMA cells is made based on a network environment, the cell reselection may be prevented from being made even though a cell reselection condition is satisfied. Thus, an unnecessary ping-pong phenomenon may be reduced during the cell reselection process, and a user may be provided with a more appropriate service more often.

According to exemplary embodiments of the present invention, a dual mode terminal and a method for controlling a cell reselection may prevent a cell reselection from being made even though a cell reselection condition is satisfied, when a corresponding cell may not provide an appropriate voice and data service during a cell reselection between a GSM cell and WCDMA cell depending on a network environment. Thus, the risk of a ping-pong phenomenon during the cell reselection may be reduced.

Also, according to exemplary embodiments of the present invention, a dual mode terminal and a method for controlling a cell reselection of a dual mode terminal may prevent the dual mode terminal from obtaining a network that may not provide an appropriate service despite an appropriate signal state.

Also, according to exemplary embodiments of the present invention, a method for controlling a cell reselection restriction of a dual mode terminal may be applied both when a network selection mode is an automatic mode and when the network selection mode is a manual mode for determining whether a corresponding cell is barred or forbidden, and may be applied to a cell reselection from a GSM cell to a WCDMA cell and a cell reselection from a WCDMA cell to a GSM cell.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling a cell reselection of a dual mode terminal, the method comprising:
    disconnecting from a currently connected first cell;
    determining whether a mode for a network selection search is set as a manual mode;
    determining whether a condition for access to a second cell is satisfied;
    determining whether a frequency and a Primary Scrambling Code (PSC) for access to the second cell are blocked if the condition for access to the second cell is satisfied;
    determining whether the second cell is included in a forbidden location area (LA) list; and
    connecting to the second cell,
    wherein the frequency of the second cell is any one of a Universal Mobile Telecommunications System (UMTS) Terrestrial Radio Access (UTRA) Absolute Radio Frequency Channel Number (UARFCN) and an Absolute Radio Frequency Channel Number (ARFCN), and
    wherein, when the manual mode is set, the determining of whether the condition for access to the second cell is satisfied is performed in response to a determination that a location registration of the first cell fails due to non-existence of suitable cells.

2. The method of claim 1, wherein the dual mode terminal supports Wideband Code Division Multiple Access (WCDMA) and Global System for Mobile communications (GSM).

3. The method of claim 1, wherein the step of determining whether the second cell is included in the forbidden LA list is performed in response to a determination that the frequency and the PSC for access to the second cell are not blocked.

4. The method of claim 1, wherein the step of connecting to the second cell is performed in response to a determination that the second cell is not included in the forbidden LA list.

5. The method of claim 1, further comprises:
    determining whether the location registration of the first cell fails in response to a determination that the mode for a network selection search is set as the manual mode.

6. The method of claim 1, wherein the first cell is a Wideband Code Division Multiple Access (WCDMA) cell and the second cell is a Global System for Mobile communications (GSM) cell, or the first cell is a GSM cell and the second cell is a WCDMA cell.

7. The method of claim 1, wherein the condition for access to the second cell comprises:
    (a) a measured Received Signal Code Power (RSCP) of the second cell is greater than a Received Level Average (RLA_C) based on an offset (FDD_Qoffset) of signal strength of the first and second cells, the RLA_C being an average of received level values of a serving first cell and a non-serving first cell;
    (b) a measured Energy to Noise Ratio (Eb/No) of the second cell is equal to or greater than a difference value between a minimum signal strength value (FDD_Qmin) of the first and second cells and an offset (FDD_Qmin_Offset) of the minimum signal strength value of the first and second cells; and
    (c) the measured RSCP of the second cell is equal to or greater than an RSCP threshold (FDD_RSCP_threshold) of the first and second cells.

8. The method of claim 1, wherein the forbidden LA list comprises at least one of a list of forbidden LAs for roaming, a list of forbidden LAs for regional provision of service, a forbidden Public Land Mobile Networks (PLMNs) list, and a list of forbidden PLMNs for General Packet Radio Service (GPRS) service.

9. A dual mode terminal, comprising:
    a condition determination unit to disconnect from a currently connected first cell, to determine whether a mode for a network selection search is set as a manual mode, and to determine whether a condition for access to a second cell is satisfied;
    a blocking determination unit to determine whether a frequency and a Primary Scrambling Code (PSC) for access to the second cell are blocked if the condition determination unit determines that the condition for access to the second cell is satisfied;

a location area (LA) determination unit to determine whether the second cell is included in a forbidden LA list; and a control determination unit to control a connection to the second cell, wherein the frequency of the second cell is any one of a Universal Mobile Telecommunications System (UMTS) Terrestrial Radio Access (UTRA) Absolute Radio Frequency Channel Number (UARFCN) and an Absolute Radio Frequency Channel Number (ARFCN), and wherein, when the manual mode is set, the determining of whether the condition for access to the second cell is satisfied is performed in response to a determination that a location registration of the first cell fails due to non-existence of suitable cells.

10. The dual mode terminal of claim 9, wherein the dual mode terminal supports Wideband Code Division Multiple Access (WCDMA) and Global System for Mobile communications (GSM).

11. The dual mode terminal of claim 9, wherein the LA determination unit determines whether the second cell is included in the forbidden LA list in response to a determination that the blocking determination unit determines that the frequency and the PSC for access to the second cell are not blocked.

12. The dual mode terminal of claim 9, wherein the control determination unit controls the connection to the second cell in response to a determination that the LA determination unit determines that the second cell is not included in the forbidden LA list.

13. The dual mode terminal of claim 9, wherein the condition determination unit determines whether the location registration of the first cell fails in response to a determination that the mode for a network selection search is set as the manual mode.

14. The dual mode terminal of claim 9, wherein the first cell is a Wideband Code Division Multiple Access (WCDMA) cell and the second cell is a Global System for Mobile communications (GSM) cell, or the first cell is a GSM cell and the second cell is a WCDMA cell.

15. The dual mode terminal of claim 9, wherein the condition for access to the second cell comprises:

(a) a measured Received Signal Code Power (RSCP) of the second cell is greater than a Received Level Average (RLA_C) based on an offset (FDD_Qoffset) of signal strength of the first and second cells, the RLA_C being an average of received level values of a serving first cell and a non-serving first cell;

(b) a condition that a measured Energy to Noise Ratio (Eb/No) of the second cell is equal to or greater than a difference value between a minimum signal strength value (FDD_Qmin) of the first and second cells and an offset (FDD_Qmin_Offset) of the minimum signal strength value of the first and second cells; and (c) the measured RSCP of the second cell is equal to or greater than an RSCP threshold (FDD_RSCP_threshold) of the first and second cells.

16. The dual mode terminal of claim 9, wherein the forbidden LA list comprises at least one of a list of forbidden LAs for roaming, a list of forbidden LAs for regional provision of service, a forbidden Public Land Mobile Networks (PLMNs) list, and a list of forbidden PLMNs for General Packet Radio Service (GPRS) service.

17. The dual mode terminal of claim 15, wherein the connection to the second cell is performed in response to a determination that the condition for access to the second cell is maintained for a first period of time.

18. The dual mode terminal of claim 15, wherein the offset (FDD_Qoffset) is increased by a certain value in response to a determination that a cell reselection to the first cell from the second cell is initiated within a second period of time after the connection to the second cell is made.

19. The dual mode terminal of claim 13, wherein the condition determination unit determines whether the location registration of the first cell fails due to non-existence of suitable cells in a corresponding location area (NO_SUITABLE_CELLS_IN_LA) in response to the determination that the mode for a network selection search is set as the manual mode.

20. A method for controlling a cell reselection of a dual mode terminal, the method comprising:

disconnecting from a currently connected first cell;

determining whether a mode for a network selection search is set as a manual mode;

determining whether a condition for access to a second cell is satisfied, wherein, if the mode for network selection search is set as the manual mode, the condition comprises a failure of a location registration of the first cell due to non-existence of suitable cells;

determining whether a frequency and a Primary Scrambling Code (PSC) for access to the second cell are blocked if the condition is satisfied;

determining whether the second cell is included in a forbidden location area (LA) list if the frequency and the PSC for access to the second cell are not blocked; and connecting to the second cell if the second cell is not included in the forbidden LA list, wherein the frequency of the second cell is any one of a Universal Mobile Telecommunications System (UMTS) Terrestrial Radio Access (UTRA) Absolute Radio Frequency Channel Number (UARFCN) and an Absolute Radio Frequency Channel Number (ARFCN).

21. The method of claim 20, wherein, when the manual mode is set, the determining of whether the condition for access to the second cell is satisfied comprises:

determining whether the location registration of the first cell fails due to non-existence of suitable cells in a corresponding location area (NO_SUITABLE_CELLS_IN_LA), and if the location registration of the first cell fails due to non-existence of suitable cells in the corresponding location area (NO_SUITABLE_CELLS_IN_LA), determining whether another condition for access to the second cell is satisfied.

* * * * *